(12) United States Patent
Liu et al.

(10) Patent No.: US 10,980,095 B2
(45) Date of Patent: Apr. 13, 2021

(54) PYROELECTRIC INFRARED SENSOR BASED LIGHTING CONTROL DEVICE AND SYSTEM

(71) Applicant: Opple Lighting Co., Ltd., Shanghai (CN)

(72) Inventors: Chaobo Liu, Shanghai (CN); Xingxing Xu, Shanghai (CN); Kun Jia, Shanghai (CN); Gongyu Wu, Shanghai (CN)

(73) Assignee: Opple Lighting Co., Ltd., Shanghai (CN)

( * ) Notice: Subject to any disclaimer, the term of this patent is extended or adjusted under 35 U.S.C. 154(b) by 0 days.

(21) Appl. No.: 16/564,715

(22) Filed: Sep. 9, 2019

(65) Prior Publication Data

US 2019/0394856 A1 Dec. 26, 2019

Related U.S. Application Data

(63) Continuation of application No. PCT/CN2018/072464, filed on Jan. 12, 2018.

(30) Foreign Application Priority Data

Mar. 9, 2017 (CN) .......................... 201710138293.3
Mar. 9, 2017 (CN) .......................... 201720226293.4

(51) Int. Cl.
 *H05B 47/105* (2020.01)
 *G01J 5/34* (2006.01)
(52) U.S. Cl.
 CPC .............. *H05B 47/105* (2020.01); *G01J 5/34* (2013.01)
(58) Field of Classification Search
 CPC combination set(s) only.
 See application file for complete search history.

(56) References Cited

U.S. PATENT DOCUMENTS 5,566,023 A * 10/1996 Kley .................. G02B 3/08
 359/565
5,986,265 A * 11/1999 Kim .................... G08B 13/193
 250/338.3

(Continued)

FOREIGN PATENT DOCUMENTS

| CN | 101782661 A | 7/2010 |
| CN | 102590879 A | 7/2012 |

(Continued)

OTHER PUBLICATIONS

International Search Report to PCT/CN2018/072464 dated Mar. 27, 2018 and English translation (12p).

*Primary Examiner* — Renan Luque
(74) *Attorney, Agent, or Firm* — Arch & Lake LLP

(57) ABSTRACT

The present disclosure provides a control device and a pyroelectric infrared sensor based lighting control system. The control device includes a focusing apparatus and at least two pyroelectric infrared sensors. The focusing apparatus includes at least two curved surface structural portions sequentially connected adjacent to each other. Each of the curved surface structural portions corresponds to one focusing point, the at least two pyroelectric infrared sensors are respectively disposed at respective focusing points, and the focusing apparatus is configured to focus external infrared signals onto the respective pyroelectric infrared sensors. The at least two pyroelectric infrared sensors are configured to convert changed infrared signals into voltage signals when any one of the pyroelectric infrared sensors receives the changed infrared signals, and then to control a switch status of a lighting fixture by using the voltage signals.

11 Claims, 12 Drawing Sheets

(56) References Cited

U.S. PATENT DOCUMENTS

| | | | | |
|---|---|---|---|---|
| 6,124,974 | A * | 9/2000 | Burger | G02B 3/0056 |
| | | | | 359/621 |
| 8,248,499 | B2 * | 8/2012 | Sutton | H04N 5/335 |
| | | | | 348/294 |
| 2007/0018106 | A1 * | 1/2007 | Zhevelev | G01J 5/0806 |
| | | | | 250/353 |
| 2008/0174429 | A1 | 7/2008 | Jensen et al. | |
| 2012/0001058 | A1 * | 1/2012 | Luke | G01J 1/0425 |
| | | | | 250/208.2 |
| 2012/0049067 | A1 * | 3/2012 | Takahashi | G01J 5/0205 |
| | | | | 250/338.2 |
| 2012/0049069 | A1 * | 3/2012 | Ni | H05B 47/105 |
| | | | | 250/340 |
| 2013/0308207 | A1 * | 11/2013 | Hu | G02B 3/0043 |
| | | | | 359/742 |
| 2014/0103214 | A1 * | 4/2014 | Messiou | G01J 1/0411 |
| | | | | 250/349 |
| 2017/0205289 | A1 * | 7/2017 | Purohit | G06K 9/00771 |

FOREIGN PATENT DOCUMENTS

| | | | |
|---|---|---|---|
| CN | 203933590 U | 11/2014 | |
| CN | 104422524 A | 3/2015 | |
| CN | 104696920 A | 6/2015 | |
| CN | 106132047 A | 11/2016 | |
| CN | 106225934 A | 12/2016 | |
| CN | 106879142 A | 6/2017 | |
| CN | 206790747 U | 12/2017 | |
| EP | 1278051 A1 | 1/2003 | |
| GB | 2470128 A * | 11/2010 | ........... G08B 13/193 |
| WO | 2012160141 A2 | 11/2012 | |

* cited by examiner

PYROELECTRIC INFRARED SENSOR BASED LIGHTING CONTROL DEVICE AND SYSTEM

CROSS REFERENCE TO RELATED APPLICATIONS

This application is a continuation application of International Application No. PCT/CN2018/072464, filed with the State Intellectual Property Office of P. R. China on Jan. 12, 2018, which is based upon and claims priority to Chinese Patent Application No. 201710138293.3 filed on Mar. 9, 2017, and Chinese Patent Application No. 201720226293.4 filed on Mar. 9, 2017, the entire contents of which are incorporated herein by reference.

TECHNICAL FIELD

The present disclosure relates to a field of lighting, in particular to a pyroelectric infrared sensor based lighting control device and system.

BACKGROUND

At present, a pyroelectric infrared sensor (PIR) and a Fresnel lens are usually combined to sense human motion. The Fresnel lens has a special optical principle, which can generate alternating visible regions and blind regions in front of the pyroelectric infrared sensor (the visible regions refer to the regions where light can pass through the lens, and the blind regions refer to the regions where light cannot pass through the lens). When someone moves in front of the lens, the infrared rays emitted by a human body continually alternate between the visible regions and the blind regions, so that infrared signals received by the pyroelectric infrared sensor are input to the pyroelectric infrared sensor in a form of a strong or weak pulse. Thus the pyroelectric infrared sensor can sense the moving human body.

However, the pyroelectric infrared sensor products in the prior art generally have problems such as small sensing range, insensitive sensing action and the like. Even there are a small number of similar products with high sensitivity, they have a problem of high price. Therefore, it is necessary to develop a pyroelectric infrared sensor device to achieve a balance among the sensing distance, the sensing sensitivity and the product cost of the pyroelectric infrared sensor products.

SUMMARY

In view of the above problems, the present disclosure is proposed to provide a pyroelectric infrared sensor based lighting control device and system that overcome the above problems or at least partially solve the above problems.

In accordance with an aspect of the present disclosure, a pyroelectric infrared sensor based lighting control device is provided, comprising a focusing apparatus and at least two pyroelectric infrared sensors, in which, the focusing apparatus comprises at least two curved surface structural portions sequentially connected adjacent to each other, the focusing apparatus is rotationally symmetric along a central axis of the focusing apparatus, and an angle is formed between a plane at which bottom of any one of the curved surface structural portions is located and a plane perpendicular to the central axis of the focusing apparatus in a direction gradually away from the central axis;

each of the curved surface structural portions corresponds to one focusing point, the at least two pyroelectric infrared sensors are respectively disposed at respective focusing points, and the focusing apparatus is configured to focus external infrared signals onto respective pyroelectric infrared sensors;

the at least two pyroelectric infrared sensors are configured to convert changed infrared signals into voltage signals when any one of the pyroelectric infrared sensors receives the changed infrared signals, and then to control a switch status of a lighting fixture by using the voltage signals.

In accordance with another aspect of the present disclosure, a pyroelectric infrared sensor based lighting control system is provided, comprising:

a lighting fixture and the pyroelectric infrared sensor based lighting control device described above, in which, the pyroelectric infrared sensors in the pyroelectric infrared sensor based lighting control device are electrically connected to the lighting fixture, and the pyroelectric infrared sensors are configured to convert changed infrared signals into voltage signals when receiving the changed infrared signals, and to control a switch status of the lighting fixture by using the voltage signals.

Hereinafter, specific embodiments of the present disclosure will be described in detail in conjunction with the accompanying drawings, so that the above-described and other purposes, features and advantages of the present disclosure are more obvious to those skilled in the art.

BRIEF DESCRIPTION OF THE DRAWINGS

Those ordinarily skill in the art will clearly understand various other advantages and benefits, through reading the detailed description of preferred implementation modes hereinafter. The accompanying drawings are provided only for illustrating the preferred implementation modes, rather than limiting the present disclosure. Throughout the accompanying drawings, same reference signs usually denote same components. In the drawings.

DETAILED DESCRIPTION

Figure 1:
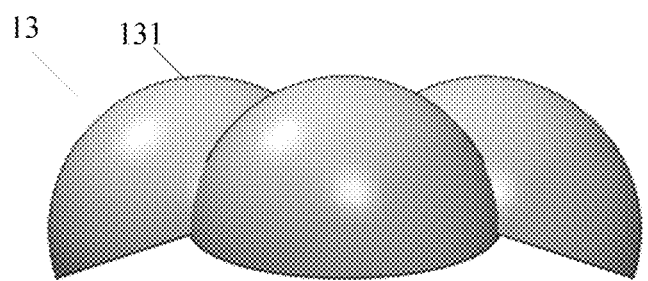
FIG. 1 illustrates a structural schematic diagram of a focusing apparatus at one angle in accordance with one embodiment of the present disclosure.

Hereinafter, exemplary embodiments of the present disclosure will be described in more detail with reference to the accompanying drawings. Although the exemplary embodiments of the present disclosure are illustrated in the drawings, it should be understood that the present disclosure may be implemented in various forms and should not be limited by the embodiments explained here. On the contrary, these embodiments are provided so that the present disclosure may be understood more thoroughly, and the scope of the present disclosure may be completely conveyed to those skilled in the art.

Figure 2:
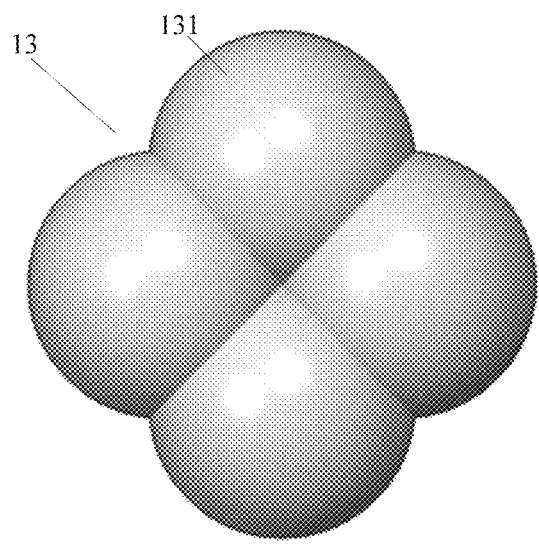
FIG. 2 illustrates a structural schematic diagram of the focusing apparatus at another angle in accordance with the embodiment as shown in FIG. 1.

In order to solve the above technical problems, at least an embodiment of the present disclosure provides a pyroelectric infrared sensor based lighting control device, which includes a focusing apparatus and at least two pyroelectric infrared sensors. The device can be mounted on and applied to the top of conference rooms, corridors and other places. Referring to FIG. 1 and FIG. 2, the focusing apparatus 13 includes at least two curved surface structural portions 131 sequentially connected adjacent to each other (the focusing apparatus 13 as shown in FIG. 1 and FIG. 2 includes four curved surface structural portions 131 sequentially connected adjacent to each other). The focusing apparatus 13 is rotationally symmetric along a central axis of the focusing apparatus, and an angle is formed between a plane at which bottom of any one of the curved surface structural portions 131 is located and a plane perpendicular to the central axis of the focusing apparatus 13 in a direction gradually away from the central axis. The at least two curved surface structural portions 131 sequentially connected adjacent to each other are integrally formed.

Each curved surface structural portion 131 corresponds to one focusing point. At least two pyroelectric infrared sensors (not shown in FIG. 1 and FIG. 2) are respectively disposed at respective focusing points, and the focusing apparatus 13 is configured to focus external infrared signals onto respective pyroelectric infrared sensors. The at least two pyroelectric infrared sensors are configured to convert the changed infrared signals into voltage signals when any one of the pyroelectric infrared sensors receives the changed infrared signals, and then to control a switch status of a lighting fixture by using the voltage signals.

In the embodiment of the present disclosure, the focusing apparatus 13 is inclined with the central axis of the focusing apparatus 13 and forms a certain angle. The positions of the respective focusing points of the focusing apparatus 13 are determined, and the respective pyroelectric infrared sensors are mounted on the respective focusing points, so that the respective pyroelectric infrared sensors and the central axis of the focusing apparatus 13 also form a certain angle, and then overlapping regions can be formed between the detection regions of the pyroelectric infrared sensors. The detection points of the pyroelectric infrared sensors are more densely distributed in the respective overlapping regions, and the pyroelectric infrared sensors can sense a small amplitude of motion in the detection regions, effectively improving the sensing sensitivity of the pyroelectric infrared sensors.

In an embodiment of the present disclosure, the focusing apparatus 13 is further configured to divide the detection regions detectable by the at least two pyroelectric infrared sensors into a plurality of visible regions and a plurality of blind regions, the plurality of visible regions and the plurality of blind regions are alternately arranged, so that in a case where there is a moving object in the detection regions, the infrared signals generated by the moving object is continuously switched between the plurality of visible regions and the plurality of blind regions, which are alternately arranged, to generate the changed infrared signals.

Continuing to refer to FIG. 1 and FIG. 2, in an embodiment of the present disclosure, the range of the angle formed by the focusing apparatus 13 with respect to the central axis may be greater than 0 degree and less than 45 degree, or may be greater than −45 degree and less than 0 degree. For example, an angle of 6.6 degree or −6.6 degree can be preferred in the range of the angle. In a case where the degree of the angle formed by the focusing apparatus 13 with respect to the central axis is 6.6 degree or −6.6 degree, the pyroelectric infrared sensors 12 located at the respective focusing points of the focusing apparatus 13 has a better sensitivity to the infrared rays. In addition, the degree of the angle formed by the focusing apparatus 13 with respect to the central axis is not limited in the embodiment of the present disclosure.

In an embodiment of the present disclosure, the curved surface structural portions 131 may be a plurality of convex lenses sequentially connected adjacent to each other, or may be a plurality of Fresnel lenses sequentially connected adjacent to each other. The specific type of the lens adopted by the curved surface structural portions 131 is not limited in the embodiment of the present disclosure.

Figure 3:
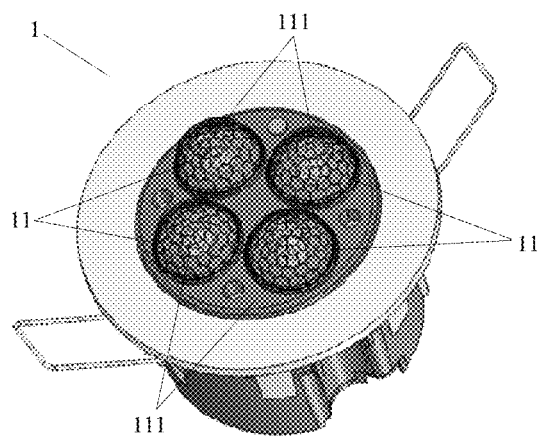
FIG. 3 illustrates a structural schematic diagram of a pyroelectric infrared sensor based lighting control device in accordance with one embodiment of the present disclosure.
Figure 4:
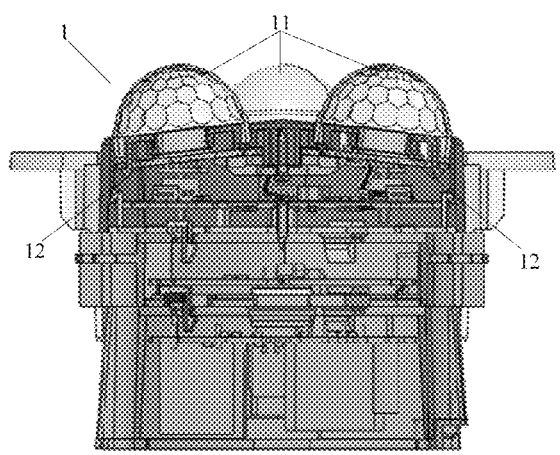
FIG. 4 illustrates a cross-sectional diagram of the pyroelectric infrared sensor based lighting control device as shown in FIG. 3.
Figure 5A:
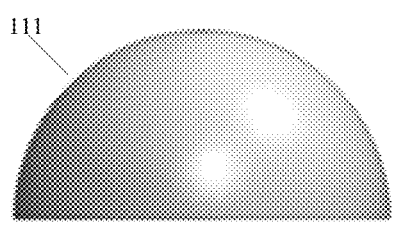
FIG. 5A illustrates a structural schematic diagram of a focusing element at one angle in accordance with one embodiment of the present disclosure.
Figure 5B:
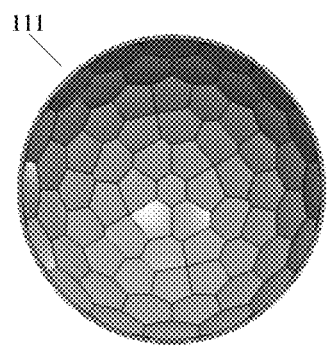
FIG. 5B illustrates a structural schematic diagram of the focusing element at another angle in accordance with the embodiment as shown in FIG. 5A.

In another embodiment of the present disclosure, the at least two curved surface structural portions 131 sequentially connected adjacent to each other included in the focusing apparatus 13 in FIG. 1 and FIG. 2 can further be replaced with at least two focusing elements 111 (four focusing elements 111 are included in FIG. 3 and FIG. 4) included in the focusing apparatus 11 as shown in FIG. 3 and FIG. 4. Shape of each of the focusing elements 111 is specifically referred to the schematic diagrams of the focusing elements 111 at different angles as shown in FIG. 5A and FIG. 5B. The embodiment will be described in detail below.

Referring to FIG. 3 and FIG. 4, the focusing apparatus 11 of the pyroelectric infrared sensor based lighting control device 1 includes at least two focusing elements 111. The at least two focusing elements 111 are circumferentially arranged along the central axis of the focusing apparatus 11, and the focusing apparatus 11 is rotationally symmetric along its central axis. In the direction gradually away from the central axis, an angle is formed between a plane at which bottom of any one of the focusing elements 111 is located and a plane perpendicular to the central axis of the focusing apparatus 11.

In this embodiment, the focusing element 111 is hemispherical structure. Each of the focusing elements 111 corresponds to one focusing point. The at least two pyroelectric infrared sensors 12 are respectively disposed at the respective focusing points, and the focusing apparatus 11 is configured to focus external infrared signals onto the respective pyroelectric infrared sensors 12. The at least two pyroelectric infrared sensors 12 are configured to convert the changed infrared signals into voltage signals when any one of the pyroelectric infrared sensors 12 receives the changed infrared signals, and then to control the switch status of the lighting fixture by using the voltage signals.

Of course, the focusing element 111 can further be in other structure form, which is not specifically limited in the embodiment of the present disclosure. In this embodiment, the focusing element 111 may be a plurality of convex lenses sequentially connected adjacent to each other, or may be a plurality of Fresnel lenses sequentially connected adjacent to each other. The specific type of the lens adopted by the focusing element 111 is not limited in the embodiment of the present disclosure.

Next, the structure and function of the Fresnel lens will be specifically described.

The Fresnel lens was invented by French physicist FRESNEL, which was pressed using an electroplating mold process and PE (polyethylene) material. Thickness of the lens of the Fresnel lens can generally be 0.5 mm, and a circle of concentric circles from small to large, shallow to deep are recorded on the surface from the center to the periphery, and the cross-section looks like sawtooth. If the ring lines composed of concentric circles are dense and dense, the Fresnel lens has a large sensing angle and a far focal distance. If the ring lines are recorded deeply, the Fresnel lens has a far sensing distance and a close focal distance. The closer the infrared rays are from the ring lines, the more concentrated the light passes through the Fresnel lens are and the stronger the rays are.

The circular lines on a same line of the Fresnel lens can form a vertical sensing region, and a horizontal sensing segment is formed between each of the circular lines. If the more the vertical sensing regions of the Fresnel lens are, the larger the vertical sensing angle is. The longer the lens of the Fresnel lens is, the more the horizontal sensing segments are, and accordingly the larger the horizontal sensing angle is. The more the amount of the segments of the Fresnel lens is, the higher the sensing sensitivity is, and a smaller range of movement of the human body can be sensed. On the contrary, the smaller the amount of the segments is, the lower the sensing sensitivity is, and a larger range of movement of the human body can be sensed. The blind regions are formed between the respective vertical sensing regions of the Fresnel lens and between the respective horizontal sensing segments. But the concentric circles of the different sensing regions are interlaced, thus reducing the blind regions between the respective segments. Because the Fresnel lens is restricted by the angle of view of the infrared probe, the vertical and horizontal sensing angles are limited, and area of the lens is also limited. The Fresnel lens can be divided into rectangular, square and circular shapes in appearance, and can be divided into single-region multi-segment, double-region multi-segment, multi-region multi-segment in function.

In addition, there are two main functions of the Fresnel lens. One function is to achieve focusing, that is, the infrared signals can be refracted or reflected to the pyroelectric infrared sensor, and the other function is to divide the detection regions of the pyroelectric infrared sensor into a plurality of visible regions and a plurality of blind regions. Each type of the Fresnel lens has a focusing point, and only the pyroelectric infrared sensor is placed at the focusing points to achieve the best focusing effect, thereby causing the sensitivity of the pyroelectric infrared sensor based lighting control device to be highest.

Figure 6A:
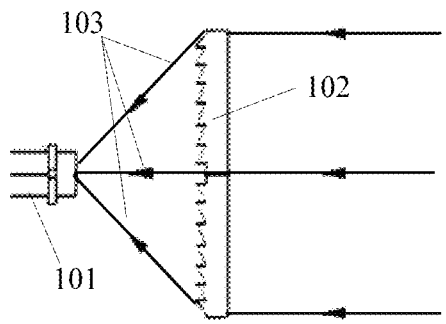
FIG. 6A is a schematic diagram illustrating that Fresnel lenses refracts external infrared rays onto the pyroelectric infrared sensors.
Figure 6B:
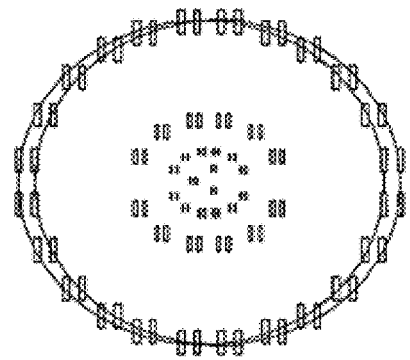
FIG. 6B is a schematic diagram illustrating a range of the pyroelectric infrared sensors as shown in FIG. 6A horizontally sensing the external infrared rays.
Figure 6C:
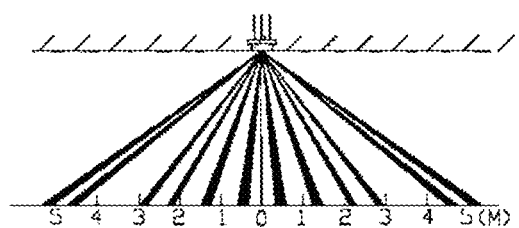
FIG. 6C is a schematic diagram illustrating a range of the pyroelectric infrared sensors as shown in FIG. 6A vertically sensing the external infrared rays.

Referring to FIG. 6A, the pyroelectric infrared sensor 101 is mounted on the focusing point of the Fresnel lens 102, and the external infrared signals (the infrared rays 103) are refracted to the pyroelectric infrared sensor 101 through the Fresnel lens 102. FIG. 6B is a schematic diagram of the range of the pyroelectric infrared sensor horizontally sensing the infrared signals, and FIG. 6C is a schematic diagram of the range of the pyroelectric infrared sensor vertically sensing the infrared signals, and the vertical sensing range as shown in FIG. 6C is 10 meters.

In the following, the focusing apparatus 11 including four focusing elements 111 arranged along a circumferential array of its central axis is an example to introduce the influence degree of different parameters on the sensitivity of the pyroelectric infrared sensor based lighting control device. The greater the sensing density of the pyroelectric infrared sensor to the infrared rays is, the higher the sensitivity of the device is.

Parameter 1, an offset distance between the focusing elements.

Figure 7A:
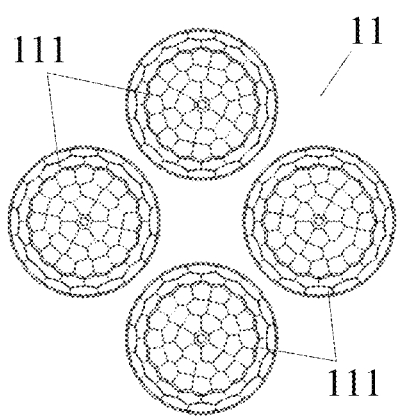
FIG. 7A, FIG. 7C and FIG. 7E respectively illustrate structural schematic diagrams of the focusing apparatus in accordance with one embodiment of the present disclosure.
Figure 7B:
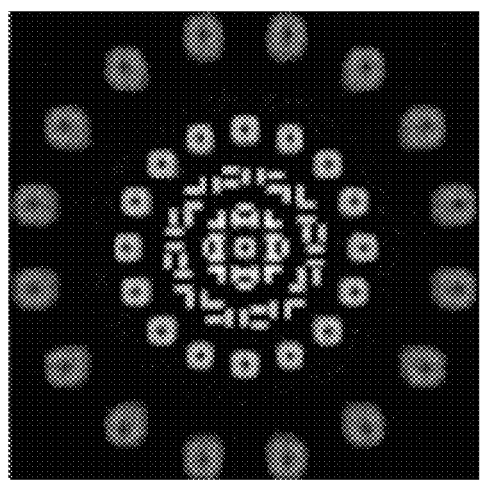
FIG. 7B, FIG. 7D, and FIG. 7F respectively illustrate sensing density maps of the pyroelectric infrared sensors in accordance with one embodiment of the present disclosure.

FIG. 7A is a schematic diagram of an array of four focusing elements 111 of the focusing apparatus 11, and FIG. 7B is a sensing density map of the pyroelectric infrared sensors (not shown in FIG. 7A) mounted on the focusing points of the respective focusing elements 111 as shown in FIG. 7A to the infrared rays.

Figure 7C:
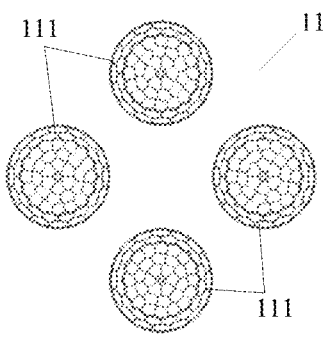
Figure 7D:
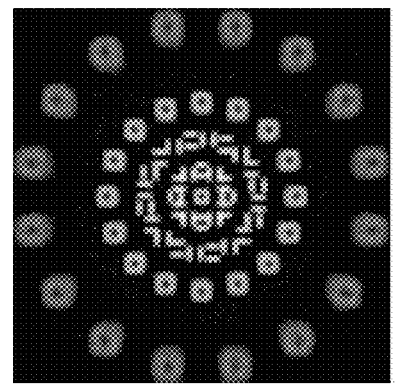

FIG. 7C is a schematic diagram of the array after the horizontal distance between the respective focusing elements 111 is increased by 10 mm on the basis of the array structure of the four focusing elements 111 as shown in FIG. 7A, and FIG. 7D is a sensing density map of the pyroelectric infrared sensors (not shown in FIG. 7C) mounted on the focusing points of the respective focusing elements 111 as shown in FIG. 7C to the infrared rays.

Figure 7E:
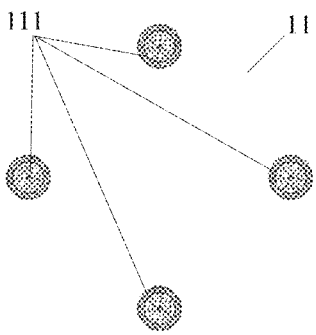
Figure 7F:
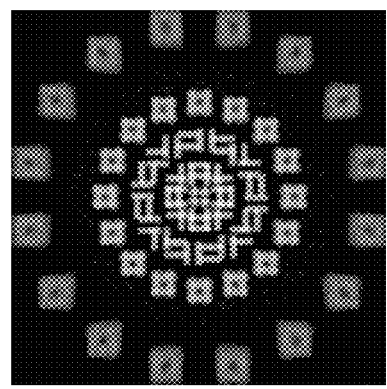

FIG. 7E is a schematic diagram of the array after the horizontal distance between the respective focusing elements 111 is increased by 100 mm on the basis of the array structure of the four focusing elements 111 as shown in FIG. 7A, and FIG. 7F is a sensing density map of the pyroelectric infrared sensors (not shown in FIG. 7E) mounted on the focusing points of the respective focusing elements 111 as shown in FIG. 7E to the infrared rays.

Parameter 2, an offset angle between the focusing elements.

Figure 8A:
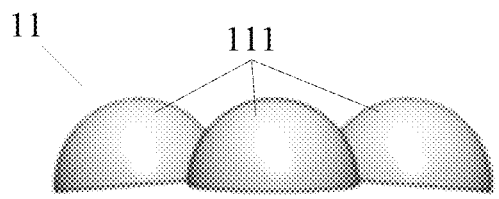
FIG. 8A to FIG. 8C respectively illustrate structural schematic diagrams of the focusing apparatus in accordance with another embodiment of the present disclosure.
Figure 8B:
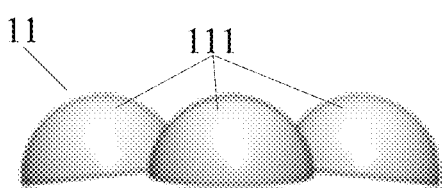
Figure 8C:
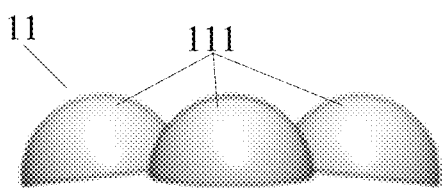
Figure 8D:
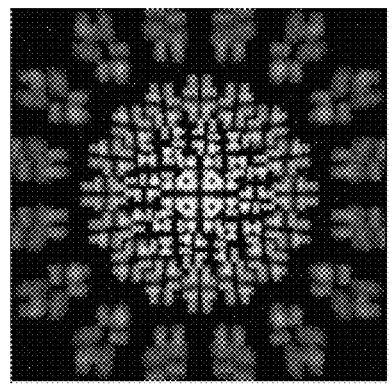
FIG. 8D to FIG. 8F respectively illustrate sensing density maps of the pyroelectric infrared sensors in accordance with another embodiment of the present disclosure.
Figure 8E:
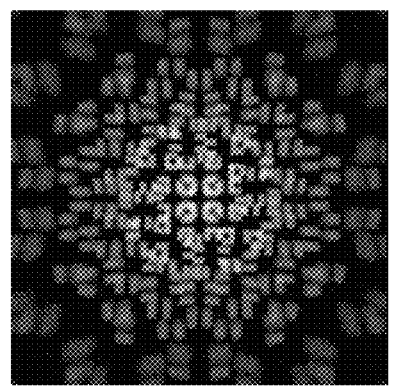
Figure 8F:
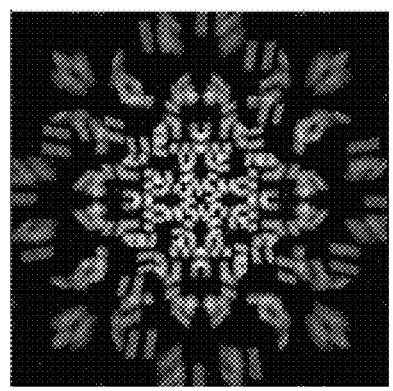

In the respective focusing apparatus 11 as shown in FIGS. 8A to 8C, the angle between the plane perpendicular to the central axis of the focusing apparatus 11 and the plane at which bottom of the respective focusing elements 111 are located is 4.6 degree, 6.6 degree, and 31 degree, respectively. The contents as shown in FIGS. 8D to 8F are sensing density maps of the pyroelectric infrared sensors (not shown in FIGS. 8A to 8C) mounted on the focusing points of the respective focusing elements 111 as shown in FIGS. 8A to 8C to the infrared rays, respectively.

Parameter three, an offset direction of the focusing elements.

Figure 9A:
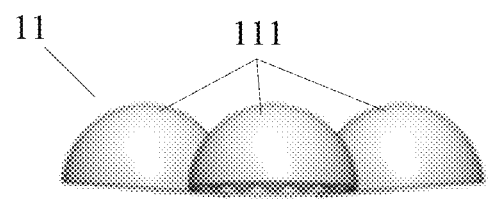
FIG. 9A to FIG. 9C respectively illustrate structural schematic diagrams of the focusing apparatus in accordance with still another embodiment of the present disclosure.
Figure 9B:
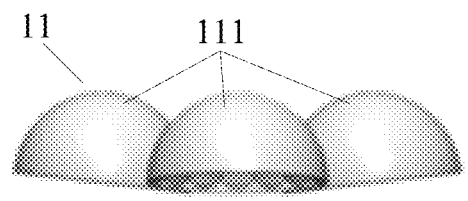
Figure 9C:
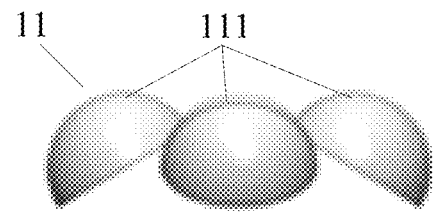
Figure 9D:
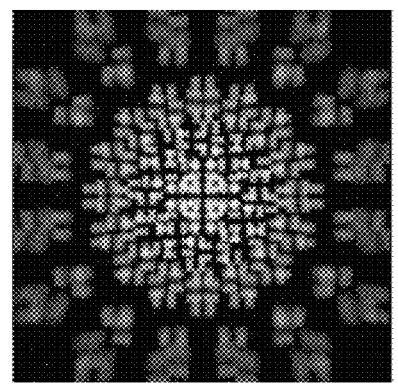
FIG. 9D to FIG. 9F respectively illustrate sensing density maps of the pyroelectric infrared sensors in accordance with still another embodiment of the present disclosure.
Figure 9E:
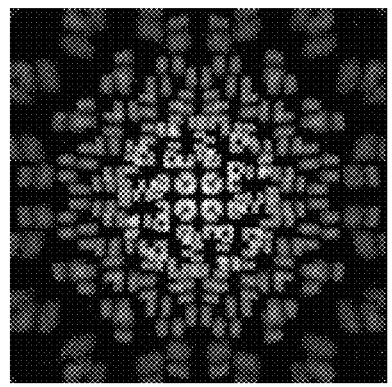
Figure 9F:
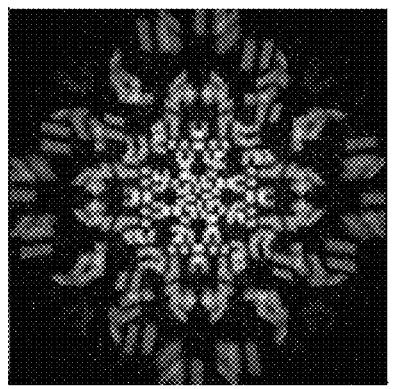

In the respective focusing apparatus 11 as shown in FIGS. 9A to 9C, the angle between the plane perpendicular to the central axis of the focusing apparatus 11 and the plane at which the bottom of the focusing elements 111 are located is −4.6 degree, −6.6 degree, and −31 degree, respectively, and the offset directions of the angles in FIGS. 9A to 9C are opposite to those of the angles in FIGS. 8A to 8C. The contents as shown in FIGS. 9D to 9F are sensing density maps of the pyroelectric infrared sensors (not shown in FIG. 9A, FIG. 9B and FIG. 9C) mounted on the focusing points of the respective focusing elements 111 as shown in FIGS. 9A to 9C to the infrared rays, respectively.

Parameter 4, a position of the chips of the pyroelectric infrared sensor with respect to the focusing points of the focusing element (selecting the pyroelectric infrared sensor with 2 chips)

Figure 10A:
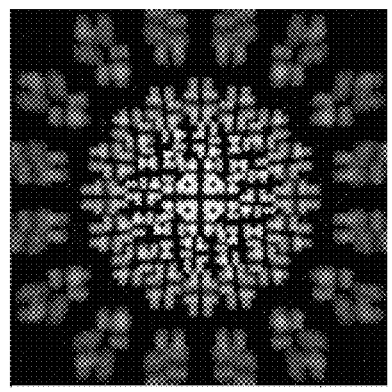
FIG. 10A to FIG. 10D respectively illustrate sensing density maps of the pyroelectric infrared sensors in accordance with another embodiment of the present disclosure.
Figure 10B:
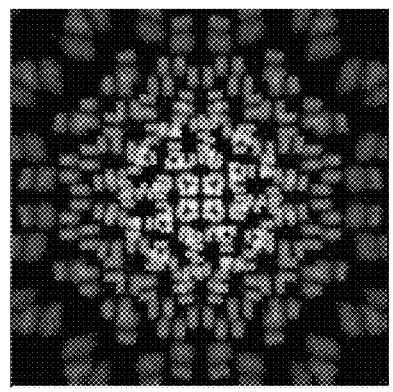
Figure 10C:
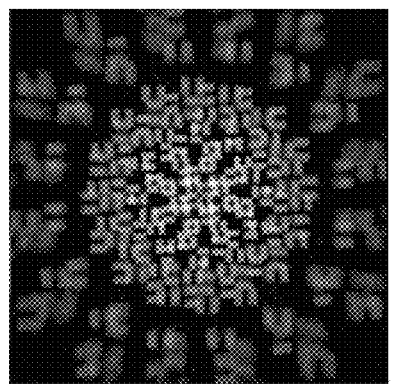
Figure 10D:
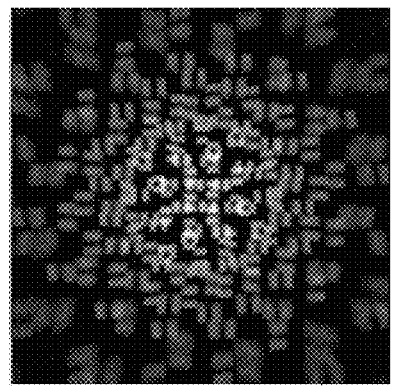

In a case where the angle between the plane perpendicular to the central axis of the focusing apparatus and the plane at which the bottom of the respective focusing elements are located is 4.6 degree and 6.6 degree, respectively, if any one of the chips of the pyroelectric infrared sensor is located at a focusing point of one focusing element, the sensing density maps of the pyroelectric infrared sensor to the infrared rays are shown in FIG. 10A and FIG. 10B, respectively. If the other chip of the pyroelectric infrared sensor is located at a focusing point of one focusing element, the sensing density maps of the pyroelectric infrared sensor to the infrared rays are shown in FIG. 10C and FIG. 10D, respectively.

Parameter 5, the amount of chips of the pyroelectric infrared sensor.

Figure 11A:
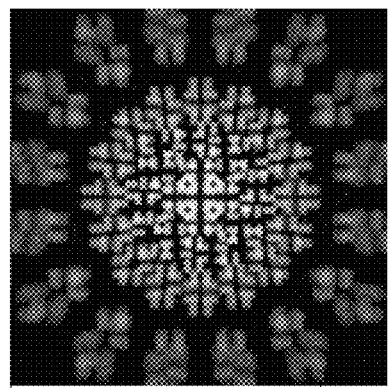
FIG. 11A to FIG. 11D respectively illustrate sensing density maps of the pyroelectric infrared sensors in accordance with another embodiment of the present disclosure.
Figure 11B:
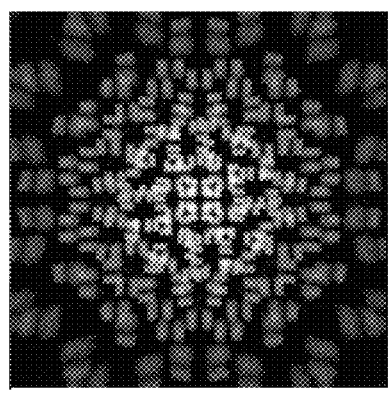
Figure 11C:
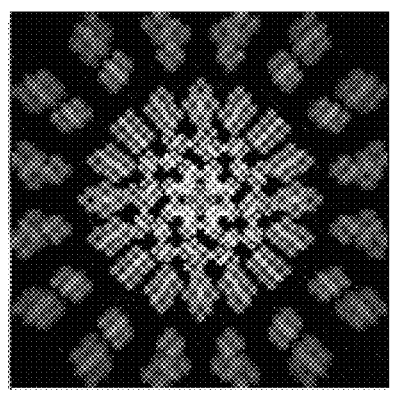
Figure 11D:
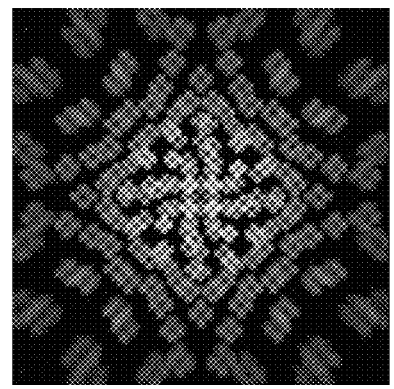

In a case where the angle between the plane perpendicular to the central axis of the focusing apparatus and the plane at which the bottom of the respective focusing elements are located is 4.6 degree and 6.6 degree, respectively, if the amount of the chips of the pyroelectric infrared sensor is two, the sensing density maps of the pyroelectric infrared sensor to the infrared rays are shown in FIGS. 11A and 11B, respectively. If the amount of the chips of the pyroelectric infrared sensor is four, the sensing density maps of the passive infrared detectors to the infrared rays are shown in FIGS. 11C and 11D, respectively.

In summary, the offset distance between the focusing elements, the offset direction of the focusing elements, and the position of the chips of the pyroelectric infrared sensor with respect to the focusing points of the focusing elements have no great influence on the sensing density of the pyroelectric infrared sensor to the infrared rays, that is, there is no great influence on the sensitivity of the pyroelectric infrared sensor based lighting control device.

The offset angle between the focusing elements and the amount of the chips of the pyroelectric infrared sensor have great influence on the sensing density of the pyroelectric infrared sensor to the infrared rays, that is, there is great influence on the sensitivity of the lighting control device based pyroelectric infrared sensor. In a case where the angle between the plane perpendicular to the central axis of the focusing apparatus and the plane at which the bottom of the respective focusing elements are located is constant, the more the amount of the chips of the pyroelectric infrared sensor is, the larger the sensing density of the pyroelectric infrared sensors to the infrared rays is.

Figure 12:
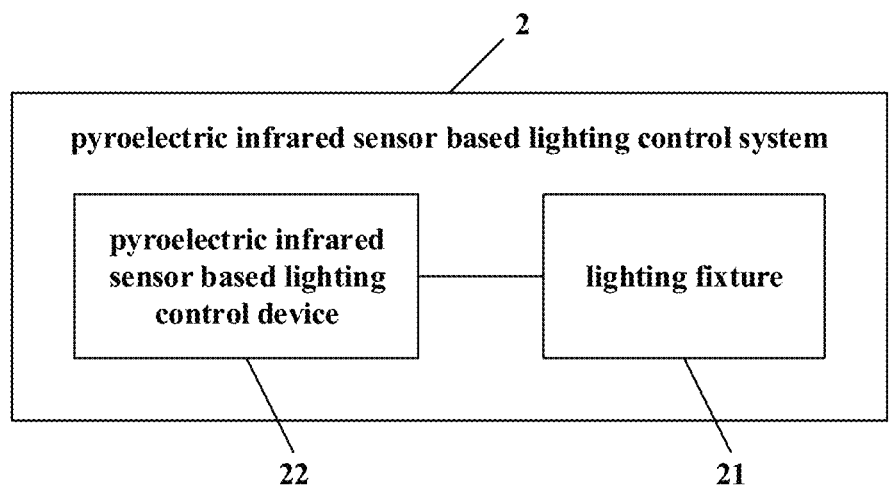
FIG. 12 illustrates a structural schematic diagram of a pyroelectric infrared sensor based lighting control system in accordance with one embodiment of the present disclosure.

An embodiment of the present disclosure further provides a pyroelectric infrared sensor based lighting control system. Referring to FIG. 12, the pyroelectric infrared sensor based lighting control system 2 includes a lighting fixture 21 and the pyroelectric infrared sensor based lighting control device 22 composed of the focusing apparatus 13 as shown in FIG. 1 and FIG. 2. The pyroelectric infrared sensors (not shown in FIG. 12) in the pyroelectric infrared sensor based lighting control device 22 are electrically connected to the lighting fixture 21, and the pyroelectric infrared sensors are configured to convert changed infrared signals into voltage signals when receiving the changed infrared signals, and to control the switch status of the lighting fixture 21 by using the voltage signals.

In an embodiment of the present disclosure, if the pyroelectric infrared sensors receive the changed infrared signal and convert the changed infrared signals into the voltage signals, the pyroelectric infrared sensors control the lighting fixture 21 to be powered with the voltage signals to realize switching-on of the lighting fixture 21.

In another embodiment of the present disclosure, the pyroelectric infrared sensor based lighting control device can further be the pyroelectric infrared sensor based lighting control device 1 as shown in FIG. 3 and FIG. 4.

Optionally, the focusing apparatus is further configured to divide the detection regions detectable by the at least two pyroelectric infrared sensors into a plurality of visible regions and a plurality of blind regions, the plurality of visible regions and the plurality of blind regions are alternately arranged, so that in a case where there is a moving object in the detection regions, the infrared signals generated by the moving object are continuously switched between the plurality of visible regions and the plurality of blind regions, which are alternately arranged, to generate the changed infrared signals.

Optionally, the at least two curved surface structural portions sequentially connected adjacent to each other are integrally formed.

Optionally, the curved surface structural portions comprise a plurality of convex lenses sequentially connected adjacent to each other or a plurality of Fresnel lenses sequentially connected adjacent to each other.

Optionally, a range of the angle is greater than 0 degree and less than 45 degree, or is greater than −45 degree and less than 0 degree.

Optionally, the angle is 6.6 degree or −6.6 degree.

Optionally, if the pyroelectric infrared sensors receive the changed infrared signals and convert the changed infrared signals into the voltage signals, the pyroelectric infrared sensors control the lighting fixture to be powered by using the voltage signals to realize switching-on of the lighting fixture.

In the embodiments of the present disclosure, a certain angle between the focusing apparatus and the central axis of the focusing apparatus is designed, thus overlapping regions between the detection regions of the respective pyroelectric infrared sensors mounted on the respective focusing points can be formed. The detection points of the pyroelectric infrared sensors in the respective overlapping regions are more densely distributed, so that the pyroelectric infrared sensors can sense a small amplitude of motion in the detection regions, effectively improving the sensing sensitivity of the pyroelectric infrared sensors. Further, in the embodiments of the present disclosure, the focusing apparatus is designed to include at least two focusing points, and the at least two pyroelectric infrared sensors are respectively disposed at the respective focusing points, thereby enabling the pyroelectric infrared sensor based lighting control device can sense a wide range of infrared signals, and then increasing the area of the regions that senses the external infrared rays.

The above description is only an overview of the technical solutions of the present disclosure, and in order that the technical solutions of the present disclosure are understood more clearly, so as to be implemented according to the contents of the specification, and the above-described and other purposes, features and advantages of the present disclosure are more obvious and understandable, specific implementation modes of the present disclosure are specifically illustrated hereinafter.

So far, it should be recognized by those skilled in the art that, although a plurality of exemplary embodiments of the present disclosure have been illustrated and described in detail herein, many other variations or modifications that conform to the principles of the present disclosure may still be directly determined or derived from the contents disclosed by the present disclosure without departing from the spirit and scope of the present disclosure. Therefore, the scope of the present disclosure should be understood and confirmed as covering all the other variations or modifications.

What is claimed is:

1. A control device, comprising a focusing apparatus and at least two pyroelectric infrared sensors,
    wherein the focusing apparatus comprises at least two curved surface structural portions sequentially connected adjacent to each other, the focusing apparatus is rotationally symmetric along a central axis of the focusing apparatus, each curved surface structural portion corresponds to a first plane and an offset angle, and the offset angle is formed between the first plane of each curved surface structural portion and a second plane perpendicular to the central axis of the focusing in a direction gradually away from the central axis, wherein a bottom of each curved surface structural portion is located at the first plane of each curved surface structural portion, and all offset angles corresponding to the at least two curved surface structural portions are of a same constant angle;
    wherein each of the at least two curved surface structural portions corresponds to one focusing point, each of the at least two pyroelectric infrared sensors is disposed at a respective focusing point, and the focusing apparatus is configured to focus external infrared signals onto respective pyroelectric infrared sensors;
    wherein the at least two pyroelectric infrared sensors are configured to convert changed infrared signals into voltage signals when any one of the pyroelectric infrared sensors receives the changed infrared signals, and then to control a switch status of a lighting fixture by using the voltage signals and
    wherein the at least two curved surface structural portions sequentially connected adjacent to each other are integrally formed.

2. The control device according to claim 1,
    wherein the focusing apparatus divides detection regions detectable by the at least two pyroelectric infrared sensors into a plurality of visible regions and a plurality of blind regions, the plurality of visible regions and the plurality of blind regions are alternately arranged, so that in a case where there is a moving object in the detection regions, the infrared signals generated by the moving object are continuously switched between the plurality of visible regions and the plurality of blind regions, which are alternately arranged, to generate the changed infrared signals.

3. The control device according to claim 1, wherein the at least two curved surface structural portions comprise a plurality of convex lenses sequentially connected adjacent to each other or a plurality of Fresnel lenses sequentially connected adjacent to each other.

4. The control device according to claim 1, wherein a range of the offset angle is greater than 0 degree and less than 45 degree, or is greater than 45 degree and less than 0 degree.

5. The control device according to claim 1, wherein the offset angle is 6.6 degree or 6.6 degree.

6. A pyroelectric infrared sensor based lighting control system, comprising:
    a lighting fixture and a control device comprising a focusing apparatus and at least two pyroelectric infrared sensors,
    wherein the focusing apparatus comprises at least two curved surface structural portions sequentially connected adjacent to each other, the focusing apparatus is rotationally symmetric along a central axis of the focusing apparatus, each curved surface structural portion corresponds to a first plane and an offset angle, and the offset angle is formed between the first plane of each curved surface structural portion and a second plane perpendicular to the central axis in a direction gradually away from the central axis, wherein a bottom of each curved surface structural portion is located at the first plane of each curved surface structural portion, and all offset angles corresponding to the at least two curved surface structural portions are of a same constant angle;
    wherein each of the at least two curved surface structural portions corresponds to one focusing point, each of the at least two pyroelectric infrared sensors is disposed at a respective focusing point, and the focusing apparatus is configured to focus external infrared signals onto respective pyroelectric infrared sensors;
    wherein the at least two pyroelectric infrared sensors are configured to convert changed infrared signals into voltage signals when any one of the pyroelectric infrared sensors receives the changed infrared signals, and then to control a switch status of a lighting fixture by using the voltage signals
    wherein the at least two pyroelectric infrared sensors in the control device are electrically connected to the lighting fixture, and the at least two pyroelectric infrared sensors are configured to convert changed infrared signals into voltage signals when receiving the changed infrared signals, and to control a switch status of the lighting fixture by using the voltage signals, and
    wherein the at least two curved surface structural portions sequentially connected adjacent to each other are integrally formed.

7. The system according to claim 6,
    wherein when the at least two pyroelectric infrared sensors receive the changed infrared signals and convert the changed infrared signals into the voltage signals, the at least two pyroelectric infrared sensors control the lighting fixture to be powered by using the voltage signals to realize switching-on of the lighting fixture.

8. The system according to claim 6,
    wherein the focusing apparatus divides detection regions detectable by the at least two pyroelectric infrared sensors into a plurality of visible regions and a plurality of blind regions, the plurality of visible regions and the plurality of blind regions are alternately arranged, so that in a case where there is a moving object in the detection regions, the infrared signals generated by the moving object are continuously switched between the plurality of visible regions and the plurality of blind regions, which are alternately arranged, to generate the changed infrared signals.

9. The system according to claim 6, wherein the at least two curved surface structural portions comprise a plurality of convex lenses sequentially connected adjacent to each other or a plurality of Fresnel lenses sequentially connected adjacent to each other.

10. The system according to claim 6, wherein a range of the offset angle is greater than 0 degree and less than 45 degree, or is greater than −45 degree and less than 0 degree.

11. The system according to claim 6, wherein the offset angle is 6.6 degree or −6.6 degree.

* * * * *